United States Patent
Patrick et al.

(10) Patent No.: US 9,363,188 B2
(45) Date of Patent: Jun. 7, 2016

(54) CABLE MODEM TERMINATION SYSTEM CONTROL OF CABLE MODEM QUEUE LENGTH

(71) Applicant: General Instrument Corporation, Horsham, PA (US)

(72) Inventors: Michael W. Patrick, Assonet, MA (US); Nate Vanderschaaf, Longmount, CO (US)

(73) Assignee: ARRIS Enterprises, Inc., Suwanee, GA (US)

(*) Notice: Subject to any disclaimer, the term of this patent is extended or adjusted under 35 U.S.C. 154(b) by 176 days.

(21) Appl. No.: 14/207,435

(22) Filed: Mar. 12, 2014

(65) Prior Publication Data
US 2014/0269293 A1   Sep. 18, 2014

Related U.S. Application Data

(60) Provisional application No. 61/789,283, filed on Mar. 15, 2013.

(51) Int. Cl.
*G01R 31/08* (2006.01)
*H04L 12/823* (2013.01)
*H04L 12/813* (2013.01)
*H04L 12/851* (2013.01)
*H04L 12/841* (2013.01)

(52) U.S. Cl.
CPC ........... *H04L 47/32* (2013.01); *H04L 47/20* (2013.01); *H04L 47/24* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 6,898,182 B1 | 5/2005 | Cloonan | |
| 7,002,914 B2 | 2/2006 | Cloonan | |
| 7,197,244 B2 | 3/2007 | Thomas et al. | |
| 7,373,378 B2 | 5/2008 | Bauman et al. | |
| 7,397,846 B1 | 7/2008 | Beser | |
| 7,512,176 B1 | 3/2009 | Beser | |
| 7,599,429 B1 | 10/2009 | Beser | |
| 7,606,154 B1* | 10/2009 | Lee | 370/232 |
| 7,822,814 B2 | 10/2010 | Bauman et al. | |
| 8,233,521 B1 | 7/2012 | Beser | |
| 2001/0055319 A1* | 12/2001 | Quigley et al. | 370/480 |
| 2003/0065809 A1* | 4/2003 | Byron | 709/232 |
| 2006/0130107 A1* | 6/2006 | Gonder | H04L 29/06027 725/110 |

(Continued)

OTHER PUBLICATIONS

J. Gettys, et al, "Buffer Bloat: Dark Buffers on the Internet", Communications of the ACM, vol. 55 No. 1, pp. 57-65 10.1145/2063176. 2063196.

(Continued)

*Primary Examiner* — Phirin Sam
(74) *Attorney, Agent, or Firm* — Lori Anne D. Swanson

(57) ABSTRACT

Buffer bloat continues to cause latency problems for all kinds of network traffic, e.g., internet protocol traffic. Implementing network based control of packet upstream packet discards enables a scheduler of packets to manage congestion, instead of the network element with bloat. In embodiments, a cable modem termination system may schedule delivery of packets and, after receiving the scheduled packets, discarding packets. The cable modem termination system may determine when to discard a packet based on a detected backlog of data in a cable modem upstream flow queue. For example, a late discard of such packets may be based on information in a schedule request received from the network element.

23 Claims, 6 Drawing Sheets

(56) References Cited

U.S. PATENT DOCUMENTS

| | | | |
|---|---|---|---|
| 2006/0168612 A1* | 7/2006 | Chapman et al. | 725/11 |
| 2007/0280291 A1* | 12/2007 | Beser | H04L 12/2801 370/468 |
| 2008/0192763 A1* | 8/2008 | Davis | H04L 12/2801 370/412 |
| 2009/0034526 A1* | 2/2009 | Ahmadi | H04W 28/06 370/392 |
| 2009/0046593 A1* | 2/2009 | Ptasinski | H04L 1/0003 370/252 |
| 2009/0238199 A1* | 9/2009 | Chapman | H04L 12/2801 370/412 |
| 2010/0074275 A1* | 3/2010 | Sahai | 370/468 |
| 2010/0309783 A1 | 12/2010 | Howe | |
| 2010/0322420 A1 | 12/2010 | Al-banna et al. | |
| 2011/0090871 A1* | 4/2011 | Kim | H04W 36/0044 370/332 |
| 2012/0030360 A1 | 2/2012 | Sanders | |
| 2013/0051276 A1* | 2/2013 | Pantelias | 370/253 |
| 2014/0003238 A1* | 1/2014 | Finkelstein | H04L 47/52 370/235 |
| 2014/0226457 A1* | 8/2014 | Hsueh et al. | 370/216 |
| 2015/0215359 A1* | 7/2015 | Bao | H04L 65/605 709/219 |

OTHER PUBLICATIONS

G. White, et al., "Right-Sizing Cable Modem Buffers for Maximum Application Performance", NCTA 2010.

"Maximum Queue Depth", CableLabs ECN MULPIv3.0-N-10.0953-3, Issued Dec. 8, 2010, available from www.cablelabs.com.

Data-Over-Cable Service Interface Specifications, DOCSIS 3.0, "Mac and Upper Layer Protocols Interface Specification"CM-SP-MULPIv3.0-123-131120, Nov. 20, 2013.

V. Jacobson, "Congestion Avoidance and Control", ACM SIGCOMM '88, Aug. 1988.

B. Braden, et al., "Recommendation on Queue Management and Congestion Avoidance in the Internet", RFC 2309, Apr. 1998.

* cited by examiner

CABLE MODEM TERMINATION SYSTEM CONTROL OF CABLE MODEM QUEUE LENGTH

CROSS-REFERENCE

The present application claims priority from U.S. Provisional Application No. 61/789,283 filed Mar. 15, 2013, entitled "Cable Modem Termination System Control of Cable Modem Queue Length," the entire disclosure of which is incorporated herein by reference.

BACKGROUND

Buffer bloat continues to cause latency problems for all kinds of network traffic, e.g., internet protocol traffic. Existing technologies address buffer bloat via a straightforward implementation where the element with the buffer bloat discards one or more packets in the buffer. Existing techniques are designed to operate on the element experiencing buffer bloat by using said element to prevent congestion by discarding packets that are not yet scheduled or transmitted. For example, Data Over Cable Service Interface Specification (DOCSIS) cable network standards related to buffer bloat explicitly require a cable modem experiencing upstream buffer bloat to drop the packet before transmitting it upstream. Conventionally, it has been desirable for various reasons that the bloated element, e.g., a cable modem element in a cable network, to control the discard of packets to eliminate the cable modem's buffer bloat. For example, conventional techniques cite reserving resources as support for dropping packets prior to any scheduling or transmission of such packets in the element experiencing the buffer bloat.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
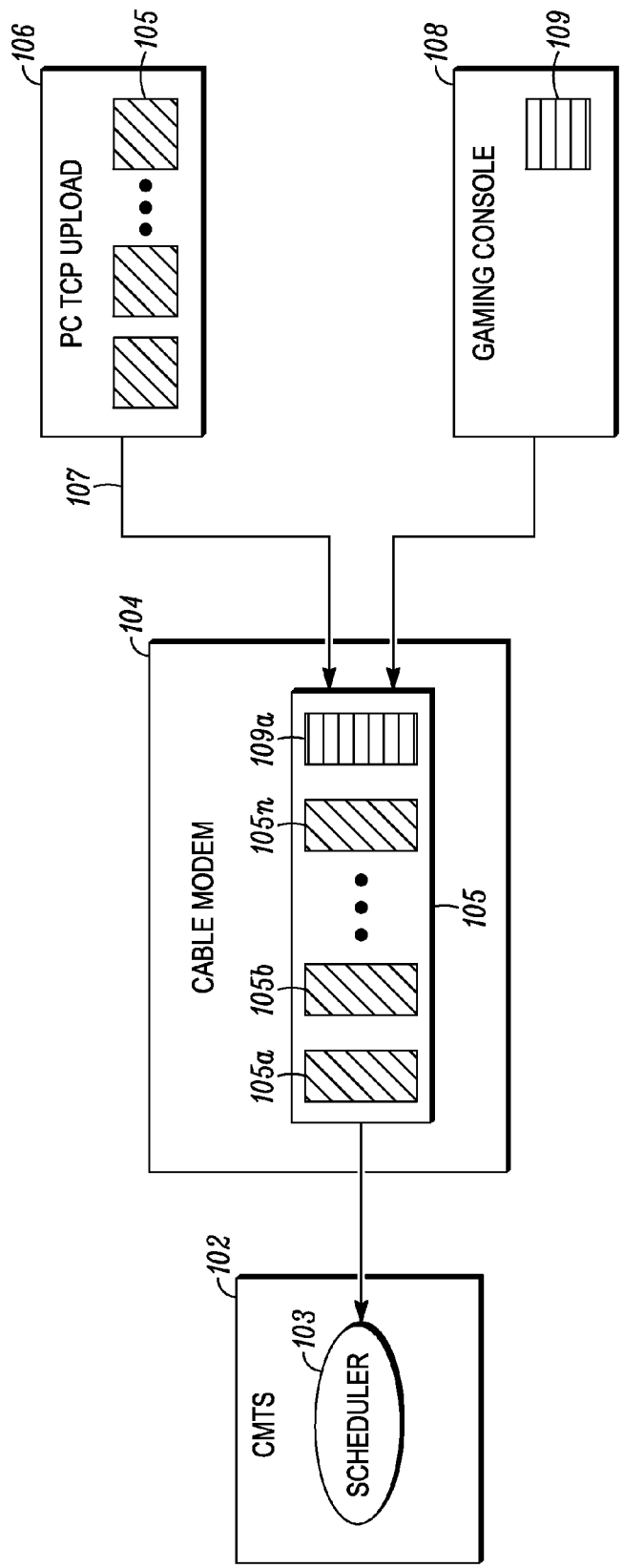
FIG. 1 depicts an example embodiment of a cable modem termination system that schedules packet delivery and performs packet discards after reception of the packet.

It is noted that while the accompanying Figures serve to illustrate embodiments of concepts that include the claimed invention, and explain various principles and advantages of those embodiments, other concepts described herein are not necessarily required to be displayed in a Figure to understand, as the details would be readily apparent to those of ordinary skill in the art having the benefit of the description herein.

DETAILED DESCRIPTION

Disclosed herein are techniques for a cable modem termination system (CMTS) to reduce the length of upstream service flow queues in a cable modem (CM) by recognizing when the cable modem (CM) queue has many backlogged transmission control protocol (TCP) payload packets, and causing the deliberate drop of an upstream TCP packet. In particular, disclosed herein are concepts directed to 1) CMTS early discard of received upstream packets and 2) CMTS trivial file transfer protocol (TFTP) proxy modification of Type-Length-Value (TLV) parameters.

The term buffer bloat refers to the condition whereby excess buffering of packets inside the network causes high latency and jitter, as well as reducing overall network throughput. For example, in the context of a network using TCP, buffer bloat is the phenomenon that occurs when a network element is transmitting to a bottleneck link with excessive buffering, such that when TCP fills those buffers, large latency delays are introduced to traffic on the link, which may include non-TCP traffic. Thus, excessive TCP buffering of traffic from a cable modem causes high latency to non-TCP traffic, such as traffic due to gaming or in-band VOIP, and results in a phenomenon called buffer bloat. Network elements with large buffers tend to experience buffer bloats as the buffers are filled based on TCP protocol.

Disclosed herein is the concept of the cable modem termination system (CMTS) managing excessive TCP forward buffering in a cable modem (CM) by using one or more techniques to recognize excessive congestion in the cable modem and deliberately dropping at least a single upstream packet. Since the congestion control is implemented in the CMTS, implementing the disclosed techniques do not require a cable modem software update. It is noted that the disclosed techniques apply to both pre-DOCSIS 3.0 cable modems and post-DOCSIS 3.0 cable modems.

Industry standards explicitly require the cable modem to simply limit the size of an upstream queue. Further, the industry has consistently maintained standards that place limits on the cable modem size, requiring the cable modem to both limit lengths and discards packet, i.e., the network element with bloat should discard. More specifically, the conventional manner for discarding packets by the bloated element is referred to as Random Early Discard (RED).

The disclosed techniques improve upon existing technologies such as RED and address buffer bloat in a unique manner. As disclosed, an element in the network that is scheduling the packets does the discarding. In the case of the cable network, instead of requiring an update to thousands of cable modem elements in a network, the CMTS can be updated with such features.

TCP operates a windowed protocol that requires each network element between the TCP endpoints to buffer at least a Bandwidth Delay Product (BDP) of the desired TCP payload bandwidth times the uncongested Round Trip Time (RTT). For example, an internet router connecting to a 10 Mbps link and with TCP endpoints having a 20 millisecond delay would need at least 10,000,000*0.020=200 Kbits of buffering, or 25,000 bytes in order to not artificially limit the TCP payload bandwidth between the endpoints. Since TCP over IPv4 has 1460 payload bytes per packet, only 18 buffers of the maximum Ethernet packet size are required to store the minimum BDP in this case.

The most common congestion control algorithm used by TCP is the known Van Jacobson algorithm. The common congestion control algorithms, and enhancements to those common control algorithms, operate by maintaining a congestion window of the number of in-flight packets permitted in each round trip time. The algorithms depend on dropped forward-path payload packets to signal congestion. The intention is to reduce the offered load by the sender on the entire network to no more than the bandwidth of the bottleneck link, i.e. the slowest link between the sender and receiver, and to dynamically adjust the TCP sending rate based on dynamically changing congestion conditions.

Decreases in memory prices have led to significantly more buffering in network elements. The bottleneck link has significantly more than the minimum required buffering for the BDP, so TCP keeps increasing its in-flight window size until the "bloated" bottleneck buffer is filled. This has the effect of introducing significant latencies to non-TCP traffic sharing the same buffer. Furthermore, the bloated buffers also can affect the TCP session itself, since TCP operates as if the connection between the endpoints has significantly slowed due to the longer forward-path queuing delay at the bloated buffer. The "tail-drop" policy by most network elements in conjunction with overlarge congestion windows causes the bloated network element to drop multiple consecutive forward TCP packets. This drops the TCP sending rate to zero and significantly slows the TCP forward rate. Conventional TCP algorithms are designed to operate with a congestion signal of dropping only a single packet. This is the motivation of Active Queue Management (AQM) approaches in the industry such as Random Early Discard (RED), which operates by dropping a single packet.

The disclosed techniques may be used to address buffer bloat that is prevalent in the cable industry, where the slowest link is the upstream RF link from cable modem (CM) to cable modem termination system (CMTS). It is not uncommon for 100 to 200 cable modems to share a single upstream channel of 10 to 30 Mbps. In a typical example, each cable modem is typically assigned a Maximum Sustained Rate (MSR) of typically 3 to 5 Mbps. In prior systems, an upstream channel will be completely saturated when about 10 percent of the cable modems concurrently attempt to send data at the cable modem's assigned MSR. In the case of cable modems, the size of the upstream buffer is determined by the modem vendor, with a typical implementation on the order of 256 buffers. For an upstream service rate of 3 Mbps, a nearly-full cable modem upstream buffer of 255 buffers of TCP packets will introduce at least a 1.0 second latency delay to upstream non-TCP packets, such as used for gaming. Upstream ping latencies of multiple seconds can be observed on modems performing upstream file transfers.

FIG. 1 depicts an example embodiment of a CMTS 102 that schedules packet delivery via scheduler 103 and performs packet discards after reception of the packet. As shown in FIG. 1, when a personal computer (PC) 106 in a home does a TCP upload at 107, the TCP packets can fill the upstream service flow buffer 105 of a cable modem 104. The filled or excess buffering may then result in significant delay of a non-TCP packet 109a, such as an update packet from a gaming console 108 in the home. Cablelabs, a consortium of cable operators/providers that define requirements for cable services, has issued at least two Engineering Change Notices (ECNs) to define Type-Length-Value (TLV) parameters in a cable modem configuration file to force the cable modem to limit the size of its upstream buffers.

Both ECNs require new software on the CM. A problem with CM-based ECNs is that it can take multiple years for cable modem software changes to be developed, tested, and deployed in the field. In many cases, cable modems are deployed from defunct manufacturers, so that it is not possible to upgrade the cable modem software with ECNs at all. Finally, the cable modem changes apply only to the current generation of DOCSIS 3.0 cable modems, and are not implementable on the still widely-deployed earlier generations of DOCSIS 1.0, DOCSIS 1.1, and DOCSIS 2.0 cable modems.

Attempts were made to address the effects of buffer bloat with the existing concepts of Active Queue Management (AQM) techniques, such as Random Early Discard. The RED algorithm, however, has been little-used in the Internet because it has the potential for dramatically limiting TCP throughput if not manually configured correctly for the exact topology of the network element. Existing concepts of random early discard call for the transmitter to perform the discard based on perfect knowledge of outgoing transmit queue sizes. All conventional techniques call for early discard of upstream packets by the cable modem before it is transmitted.

The disclosed techniques perform packet discards by the CMTS after reception of the packet. This differs from existing buffer bloat control mechanisms because it is a "late" discard, after the packet has been transmitted. Existing techniques involve "early" discard, before transmission, by the network element experiencing the buffer bloat. The disclosed late discard approach, in pre-DOCSIS 3.0 cable modems, is based on imperfect knowledge of the size of the CM's transmit queues derived from the rate of bandwidth requests.

In embodiments, rather than requiring each cable modem in a network to implement a software change, the cable modem TCP buffer bloat is controlled solely on the CMTS. Different from active queue management, disclosed embodiments perform a late discard after the packet has been received at the CMTS, rather than an early discard in the CM.

Figure 2:
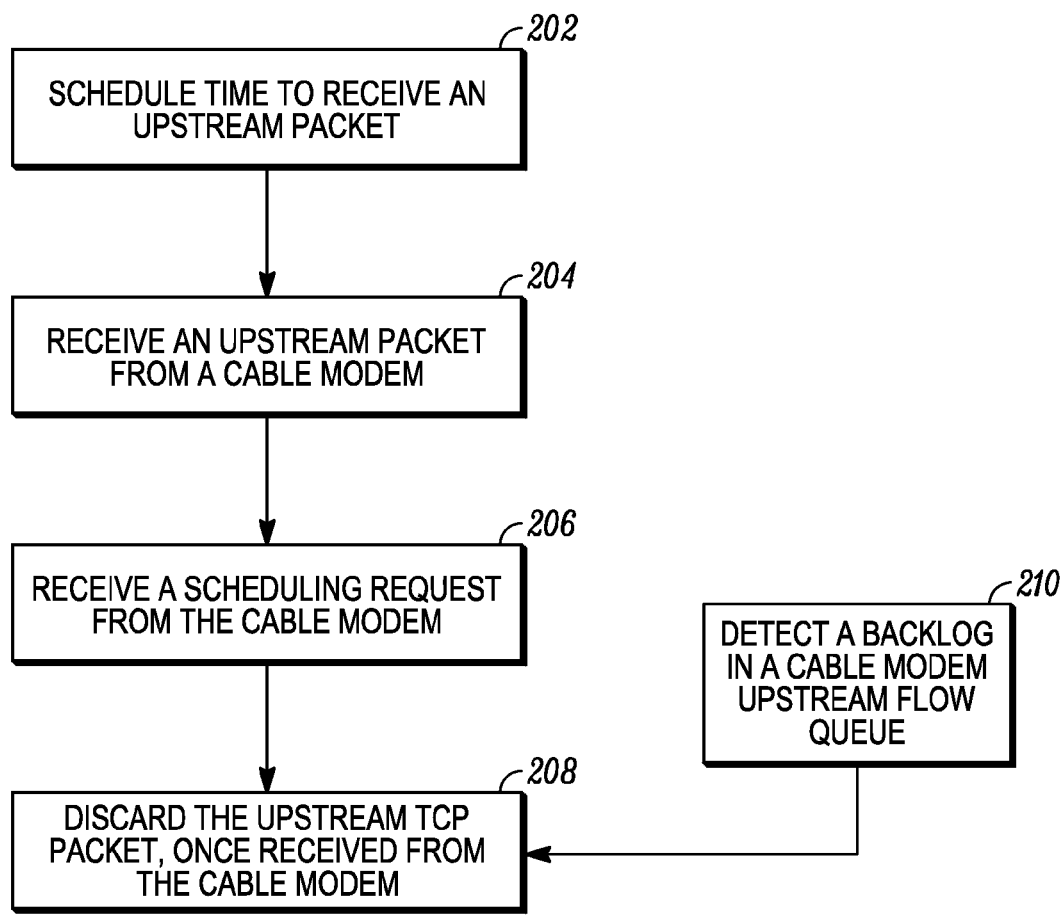
FIG. 2 depicts a flow diagram for a cable modem termination system's management of transmission control protocol (TCP) forward buffering in a cable modem.

FIG. 2 depicts a flow diagram for a CMTS's management of transmission control protocol (TCP) forward buffering in a cable modem. At 202, the CMTS schedules time to receive a packet on an upstream channel from the cable modem. The CMTS, at 204, receives at least one upstream packet from the cable modem during the scheduled time and, at 206, receives at least one scheduling request from the cable modem. It is noted that non-TCP traffic may share the same buffer in the upstream direction from the cable modem to the cable modem termination system as the TCP traffic. At 206, after receiving the upstream packet, the CMTS elects to discard the received packet.

The CMTS performs the late discard, i.e., after receipt of the scheduled transmission, based on information in the schedule request received at 206. The information in the at least one scheduling request from the cable modem that the cable modem termination system uses as the basis to discard a received upstream TCP packet may be a size of a cable modem upstream service flow queue. The CMTS may estimate the size of the cable modem upstream service flow queue or may receive it as a reported value from the cable modem. For example, the cable modem termination system may estimate the size of the upstream service flow queue by counting consecutive piggybacked bandwidth requests from the cable modem.

The cable modem termination system, at 210, may determine when to discard a packet based on a detected backlog of data in a cable modem upstream flow queue. In embodiments, the cable modem termination system detects the backlog of data in the cable modem upstream service flow from a backlog parameter of a DOCSIS Continuous Concatenation and Fragmentation bandwidth request received from the cable modem. In embodiments, the cable modem termination system detects the backlog of TCP payload packets on the cable modem upstream flow queue by snooping upstream and downstream packets to recognize TCP streams. In embodiments, detecting the backlog of data comprises identifying excessive buffering of transmission control protocol (TCP) payload packets in the cable modem upstream flow queue.

The received upstream TCP packet selected for discarding may be only of a particular format. For example, the TCP upstream packet selected for discarding may be particular format of a TCP payload packet.

As described in more detail below, the cable modem termination system may modify or remove a Maximum Sustained Rate (MSR) Type-Length Value (TLV) parameter of a cable modem configuration file to enable the cable modem to make bandwidth requests in excess of a configured MSR TLV.

In embodiments, after an initial discard by the cable modem termination system of the at least one received upstream TCP packet, the cable modem termination system may disable discarding for a cable modem upstream service flow for a time interval. The time interval may be fixed, configured, or dynamically calculated via an algorithm.

Embodiments disclosed for controlling cable modem queue lengths, that may rely solely on the CMTS by preemptively dropping upstream packets that have been received from a cable modem, has not been contemplated in particular because the CMTS had to schedule time on the possibly congested upstream channel to receive the packet in the first place. But, because the disclosed concepts have contemplated implementation of the techniques without modification to the deployed behavior of both pre- and post-DOCSIS 3.0 cable modems, the disclosed techniques improve upon existing techniques, such as Active Queue Management (AQM) or Random Early Discard (RED) algorithm. In particular, the disclosed concepts do not make the drop decision by the transmitting element (the cable modem in this case), but instead by the receiving element (the CMTS).

Figure 3:
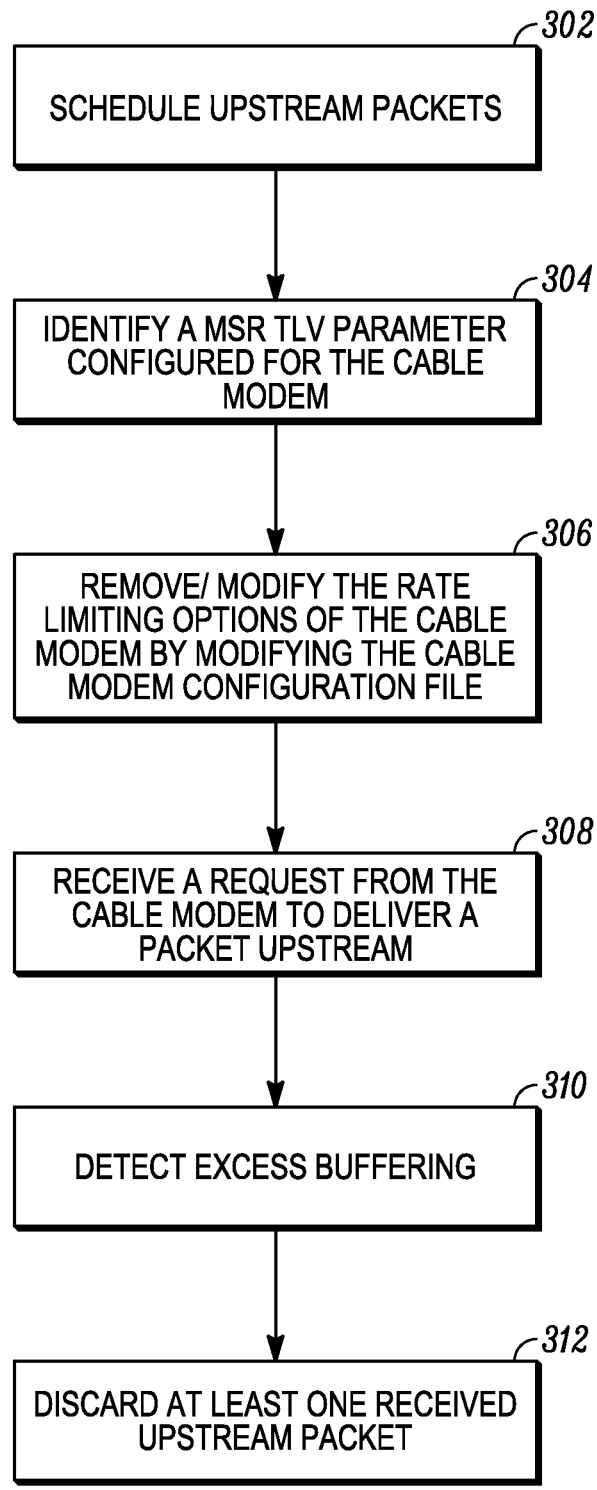
FIG. 3 depicts another embodiment for a cable modem termination system for managing the transmission control protocol forward buffering in a cable modem.

FIG. 3 depicts another flow diagram for managing the transmission control protocol forward buffering in a cable modem. As disclosed, the transmitting element, e.g., the cable modem termination system, functions as a cable modem proxy for managing transmission control protocol forward buffering in a cable modem. At 302, the CMTS does scheduling of upstream packets. As described in more detail below, the CMTS, by scheduling at greater than the intended Maximum Sustained Rate from cable modem, can determine that the cable modem has backlogged buffers. The disclosed techniques take a unique approach of scheduling a packet then dropping it, thus proceeding with the effort to use the bandwidth, but then drop it after deliberately scheduling it. In this manner, because the CMTS is scheduling upstream, the CMTS is dropping after receipt. The conventionally accepted method for forwarding packets along is to schedule them first, and then forward. It is not conventional to deliberately discard a received upstream packet In DOCSIS versions before 3.0, a cable modem requests one upstream burst at a time for a "service flow." The CMTS then schedules a "grant" interval for the cable modem in the future, and informs all cable modems of the future grants with a "map" message. When the cable modem sends its data during the granted time, it can "piggyback" a request for its next upstream burst. In the disclosed concepts, the CMTS is able to recognize large cable modem queue sizes in pre-3.0 cable modems by patterns in the arrival of piggybacked requests. A piggybacked request by a cable modem means that the cable modem has at least one backlogged packet in its upstream buffer. A sequence of piggybacked request/grant cycles can be performed before forwarding the first packet upstream, thereby allowing the CMTS to determine the number of already-backlogged packets in the cable modem upstream buffer.

In conventional networks, the cable modem only sends up requests at its max rate, such that the CMTS is unable to identify if the cable modem is bloated without discovering a bloat (e.g., by the cable modem sending packets faster than it is supposed to). For example, in conventional networks, the cable modem sends upstream requests for bandwidth at only a configured Maximum Sustained Rate (MSR), so the CMTS is not able to detect the presence of buffer bloat in the cable modem. Because the cable modem will conventionally only make requests to a configured Maximum Sustained Rate (MSR), the disclosed techniques revise conventional techniques such that the cable modem does not limit its requests to an MSR, but the CMTS issues grants to an MSR.

As illustrated in FIG. 3, at 304, the cable modem termination system identifies the MSR TLV parameter configured for the cable modem. In embodiments, the CMTS, at 306, may remove the rate limiting options of the CM, or the CMTS may change the max rate of the cable modem (e.g., make it larger).

In an example implementation of the disclosed techniques, the CMTS can learn and continue to learn the MSR from a cable modem configuration file. Since the CMTS can implement a TFTP proxy, it can remove, for example at 306, any MSR TLVs signaled to the cable modem in the configuration file read via TFTP and re-calculate a Message Integrity Code (MIC) before forwarding it to the CM. With no MSR TLVs, the cable modem will always request to deliver a packet upstream when it has a backlog. Such request may be received by the CMTS at 308. Thus, the CMTS knows the configured MSR for the flow, but the cable modem does not. The CMTS enforces the MSR by its pattern of grants to the CM, but the cable modem always sends a request (possibly piggybacked) when it has an enqueued packet.

With the disclosed concepts of unlimited cable modem requests, the CMTS, at 310, can detect a large cable modem queue by deliberately granting in excess of the MSR and check whether the cable modem has a backlog for which it piggybacks a request. In particular, the CMTS can detect when it has granted a burst of data to the cable modem that exceeds a planned Bandwidth-Delay Product (BDP) for the CM's actually configured MSR and a planned worst-case Internet round-trip time (RTT). For example, suppose the cable modem has an MSR of 3.0 Mbps, and the worst-case internet round-trip-time is planned to be 50 milliseconds. The BDP in this case is $3.0*0.05=0.15$ Mbits, or 18750 bytes. When the CMTS grants a continuous set of piggybacked requests that exceeds 18750 bytes (before forwarding the first packet), the CMTS, at 312, drops a single upstream packet and forwards it's held packets. It then restarts the count of continuous piggybacked requested bytes. Having the CMTS "hold" the burst of packets forwarded upstream deliberately delays the transmission by the upstream receiver of an "ACK" packet, allowing the CMTS to empty the CM's upstream buffer of an entire TCP transmit window.

Thus, the disclosed techniques address deficiencies of conventional techniques that describe an input channel-to-receiver mapping method and use "random early discard" as an operation, where the disclosed techniques do not require random early discard. Further, the disclosed techniques address upstream transmissions, unlike some existing optical networks that pre-transmit random early discard for downstream directions only. Unlike conventional technologies that perform pre-transmit discard, the disclosed techniques describe post-reception discard. Further, the disclosed techniques improve congestion at the receiver differently than conventional techniques, by deliberately discarding an already-received packet that is scheduled by the receiver.

Since the vast majority of internet traffic is TCP, in most cases the dropped packet will be a TCP packet that will signal to the TCP sender to throttle back on its upstream transmit rate. This is similar to the goal of active queue management in internet network elements, however differs from all known prior art of active queue management because the dropping of a packet is based on a receive rate at a CMTS rather than the size of transmit queue in a network element. The Random Early Discard algorithm only uses transmit queue sizes.

Enhancements to the disclosed techniques include counting only TCP packets in the granted backlog, or counting only an individual TCP stream in the granted backlog to signal when a received packet should be dropped.

For DOCSIS 3.0 cable modems using the "Continuous Concatenation and Fragmentation" (CCF) technique for bandwidth requests, the CMTS can directly tell the size of the cable modems queue. Thus, the CMTS can use that information to discard a single already-received upstream packets based on that information. This includes but is not limited to any "early discard" algorithm. Embodiments may use any other classification of the upstream packet to enable or disable the discard of received packet for purposes of controlling the cable modem backlog of TCP packets.

Another method calls for the CMTS to snoop both upstream and downstream traffic to recognize upstream TCP streams. From this snooping, the CMTS can determine the maximum size of the TCP window, and detect when the cable modem could be potentially queuing a large number of bytes of unacknowledged upstream payload bytes. The CMTS can do this by noting the TCP sender/receiver window sizes at session startup, and then computing the maximum potential number of un-requested upstream bytes as the difference between the smaller of the sender or receiver window size and the number of unacknowledged upstream payload bytes. In this case, the CMTS effectively doesn't permit the forward direction to fill the CM's upstream buffer with even a single large scaled TCP window size. Windows 7 introduced support for TCP scaling, while Windows XP did not, which is one reason that cable modem buffer bloat is a relatively recent problem. Post-reception discard performed as disclosed is unique.

The disclosed techniques may apply in a Data Over Cable Service Interface Specification (DOCSIS) architecture. DOCSIS was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

Figure 4:
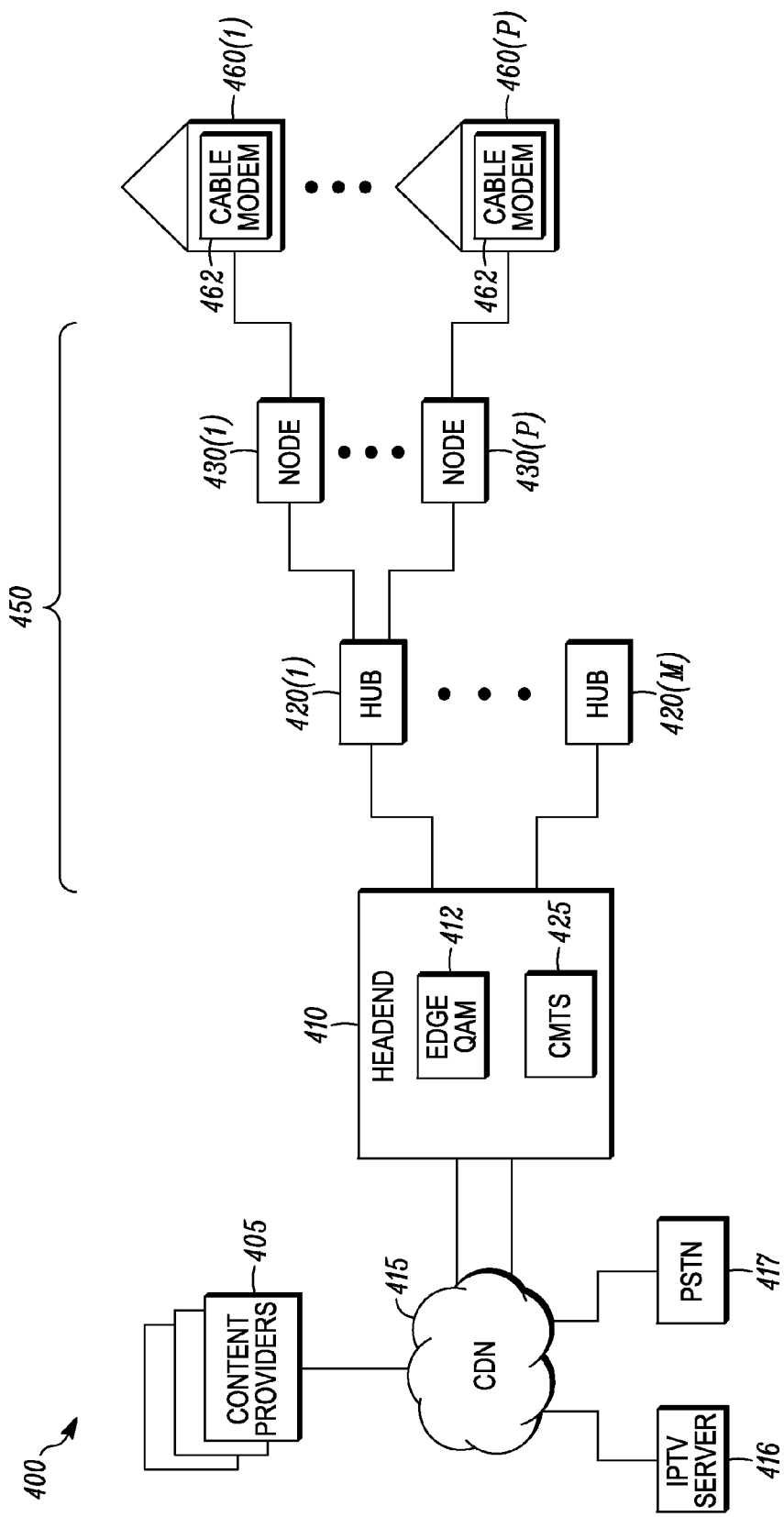
FIG. 4 illustrates an example cable system that may implement the disclosed techniques in a typical DOCSIS architecture.

FIG. 4 illustrates an example cable system 400 that may implement the disclosed techniques and may comply with DOCSIS. The system 400 includes a headend or headend facility (HEF) 410, a plurality of hubs 420(1)-420(m). Associated with each hub are a plurality of nodes 430(1)-430(n) and a plurality of customers 460(1)-460(p). The HEF 410 or hubs 420 may include such devices as an edge quadrature amplitude modulation (EQAM) device 412 or a cable modem termination system (CMTS) 425. Each of the nodes 430 has one or more corresponding access points, and each of the customers 460 has one or more corresponding network elements 462, shown in FIG. 4 as a cable modem.

The headed 410 can provide video, data, and voice data to a subscriber 460 via a hub 420 and/or node 430. A single node 430 may be connected to hundreds of network elements 462. Described herein are techniques related to a cable modem network element 462; however it should be understood that the cable modem is used by way of example as the concepts apply to other network elements. Examples of network elements include cable modems (as shown in FIG. 4), set top boxes, televisions equipped with set top boxes, data over cable service interface specification (DOCSIS) terminal devices, media terminal adapters (MTA), and the like. Thus, where reference is made to a cable modem, the concepts also apply more broadly to a network element.

A cable system 400 provides one or more of commercial TV services, Internet data services, and voice services, e.g., Voice-over-Internet Protocol (VoIP) to one or more customer locations 460 (i.e., end users) in a given geographic area. To provide these services, the HEF 410 in the example cable system 400 in FIG. 4 is shown coupled via a content delivery network 415 to a plurality of content providers 405, an IPTV network/server 416, and a public switched telephone network (PSTN) 417. Video streams can be received from a video source (or sources), such as from a content provider 405 or through an IP network/server 416. In some implementations, the video streams enter the system as raw moving picture experts group (MPEG) streams, or any other streaming video protocol supported by the headend 410 and/or EQAM device. 412

The content delivery network 415 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 415 comprises, for example, a packet-switched network that is capable of delivering IP packets from the IPTV Server 416 to clients 460(1)-460(p), using, for example, a cable data network, PON, or the like. Examples of a content delivery network 415 include networks comprising, for example, managed origin and edge servers or edge cache/streaming servers.

Content delivery servers in the content delivery network 415 deliver content via one or more wired and/or wireless telecommunication networks to users 460(1)-460(p) via a headend 410 and a communication link 450. In an illustrative example, content delivery network 415 comprises communication links in network 450, where communication links connect each distribution node and/or content delivery server to one or more client devices, e.g., for exchanging data with and delivering content downstream to the connected client devices 460(1)-460(p). The communication links may include, for example, a transmission medium such as an optical fiber, a coaxial cable, or other suitable transmission media or wireless telecommunications.

Cable systems such as the cable system 400 shown in FIG. 4 may employ a hybrid fiber-coaxial (HFC) cable network system. A typical HFC network uses optical fiber for communications between the headend 410 and the nodes 430 and coaxial cable for communications between the nodes 430 and the end user network elements 462. Downstream (also referred to as forward path) optical communications over the optical fiber are typically converted at the nodes 430 to RF communications for transmission over the coaxial cable. Conversely, upstream (also referred to as return path) RF communications from the network elements 462 are provided over the coaxial cables and are typically converted at the nodes 430 to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 430 communicate via optical fibers with the hubs 420 and via coaxial cable to customer premises 460.

The HEF 410 and/or the hubs 420 may be coupled to the IPTV server 416 and PSTN 417 via the CDN 415, e.g., the Internet, for providing Internet and telephony services (e.g., to and from customer 460(1)-460(p)) via the CMTS 425. The CMTS 425, in an embodiment, is a general-purpose computing device or application-specific integrated circuit (ASIC) that converts downstream digital data to a modulated RF signal, which is carried over the fiber and coaxial lines in the HFC network 450 to one or more customer locations 460. A communication interface may connect the CMTS 425 to the content delivery network 415 for routing traffic between the HFC network 450 and the internet network, the IP network 415, a PSTN, and/or the content providers 405. The various content providers, 405 for example, may be the source of media content (e.g., movies, television channels, etc.).

Data services can be handled by the headend 410 through the CMTS 425 The CMTS 425 can receive data signals from user device(s) 460 and through an external network (e.g., the Internet). The external network, for example, can operate using Internet protocol (IP), sending data packets to and receiving data packets from the headend 410. In some examples, the CMTS can be paired with a SIP proxy server operable to provide voice over internet protocol (VoIP) services with connectivity to the public switched telephone network (PSTN) 417. In still further examples, one or more video sources may provide streaming data through the external network 415 to the CMTS 425.

The CMTS 425 can forward received packets to the EQAM device 412 used to modulate the signal onto a carrier waveform. The carrier waveform can include both data and video streams, in both multicast and unicast (e.g., point-to-point) formats for transmission to one or more cable modems and/or set top boxes 462 via a hybrid fiber-coax (HFC) network 450. It should be understood that in some implementations, the modulation functionality (or portions thereof) can be incorporated into the CMTS 425. Thus, a CMTS 425 can include a modulator operable to modulate the signal onto a carrier wave and/or slot the carrier wave into a DOCSIS channel to be combined with other DOCSIS channels by a combiner.

In some implementations, data packets can be separated into multiple queues at a network device (e.g., a CMTS 425, EQAM 412, network router, etc.) based upon a type of data associated with the data packets. Different types of data can have different quality of service (QoS) characteristics, respectively. In various instances, the QoS characteristic can be based, for example, upon a standard associated with the type of data contained in the data packet. For example, for application layer queuing, video conferences or voice conversations might be identified as of the highest priority type of data based upon bandwidth constraints and/or nature of the data session (e.g., real-time communications). Alternatively, electronic mail (e.g., e-mail) might be of lower priority because such packets only have a "best efforts" delivery priority. In other examples, queuing can be based upon lower level packet information, such as, e.g., a protocol type associated with the packet.

It should be noted that there are multiple embodiments of a CMTS 425 architecture, such as a CMTS with an integrated physical (PHY) layer, a CMTS with a distributed PHY, or a Converged Cable Access Platform (CCAP) architecture in which the QAM is placed in an edge QAM. In FIG. 4, the edge QAM 412 is shown in the headend 410, but the edge QAM 412 may be located downstream from the CMTS 425. The CMTS 425 may host downstream and upstream ports and may use separate F connectors for downstream and for upstream communication for flexibility. In embodiments, a communication interface utilizing downstream channels 1-4 connects the CMTS 425 to a portion of the HFC network 450 for communicating over the HFC network 450.

By way of example, embodiments described herein include a cable modem network element 462 at the customer's premises 460 for receipt of the modulated signals from the HEF 410 and/or CMTS 425. A cable modem 462 is a type of network bridge and modem that provides bi-directional data communication via radio frequency channels on a cable network, such as a hybrid fiber-coaxial plant (HFC) or RFoG infrastructure. For example, a cable modem can be added to or integrated with a set-top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 462 may be connected to IPTV receivers or other items of CPE. A customer PC or laptop as well as other associated devices such as tablets, smartphones or home routers are termed customer premises equipment (CPE).

The network element, e.g., cable modem, 462 is connected through the network 450 to the CMTS 425. The cable modem converts signals received from the CMTS 425 carried over fiber and/or coaxial lines in the network. Cable modems 462 convert the digital data to a modulated RF signal for upstream transmission and convert downstream RF signal to digital form. Thus, the conversion is done at a subscriber's facility. The cable modem 462 demodulates the downstream RF signal and feeds the digital data to a CPE or an IPTV, for example. On the return path, digital data is fed to the cable modem (from an associated PC in the CPE, for example), which converts it to a modulated RF signal. Once the CMTS 425 receives the upstream RF signal, it demodulates it and transmits the digital data to its eventual destination. Cable modems 462 are therefore useful in transforming the cable system into a provider of video, voice and data telecommunications services to users.

The term buffer bloat refers to the condition whereby excess buffering of packets inside the network causes high latency and jitter, as well as reducing overall network throughput. For example, in the context of a network using TCP, buffer bloat is the phenomenon that occurs when a network element 462 is transmitting to a bottleneck link in the network 450 with excessive buffering, such that when TCP fills those buffers, large latency delays are introduced to non-TCP traffic. Thus, excessive TCP buffering within a cable modem causes high latency to non-TCP traffic, such as non-TCP traffic related to gaming or in-band VOIP. The latency to the TCP and/or non-TCP traffic results in a phenomenon called buffer bloat. Network elements with large buffers tend to experience buffer bloats as the buffers are filled based on TCP protocol.

As disclosed above, the cable modem termination system (CMTS) may be modified to manage excessive TCP forward buffering in a cable modem (CM) by using the various techniques described herein to recognize excessive congestion in the cable modem and the deliberate dropping of at least single upstream packet. Thus, rather than modifying the cable modem to address excess buffering, the transmitting element, the CTMS, modifies its flow. Since the congestion control is implemented in the CMTS, implementing the disclosed techniques do not require a cable modem software update. It is noted that the disclosed techniques apply to both pre-DOCSIS 3.0 cable modems and post-DOCSIS 3.0 cable modems.

The cable network 400 may implement the disclosed congestion reduction techniques using a Data Over Cable Service Interface Specification (DOCSIS) protocol. DOCSIS is an international telecommunications standard that permits the addition of high speed data transfer to an existing cable television (CATV) network, such as cable network 400. The DOCSIS protocol is the protocol used to send digital video and data between a hub or headend facility and cable modem. DOCSIS is used to convey Internet or other packet based networking information, as well as packetized digital video between CMTSs and cable modems. DOCSIS is employed by many cable operators to provide Internet access over their existing network infrastructures, e.g., hybrid fiber-coaxial (HFC) infrastructure, PON architectures, etc. While embodiments are disclosed with reference to DOCSIS, the load balancing implementations may apply to other networks or systems.

A typical DOCSIS architecture includes a cable modem (CM) located at the customer premises, and a cable modem termination system (CMTS) located at the CATV headend, as in the example cable network 400 depicted in FIG. 4. In an embodiment, a memory in the headend, such a memory of the CMTS 425 or edge device, may include a DOCSIS program that implements the DOCSIS specification.

DOCSIS provides a variety in options available at Open Systems Interconnection (OSI) layers 1 and 2, the physical layer, and the data link layer. For example, a DOCSIS physical layer may include the basic networking hardware transmission technologies of a network. A DOCSIS physical layer may be configured to define a manner of transmitting raw bits rather than logical data packets over a physical link connecting network nodes. The bit stream may be grouped into code words or symbols and converted to a physical signal that is transmitted over a hardware transmission medium. The modulation scheme to use and similar low-level parameters are defined by the DOCSIS scheme.

Figure 5:
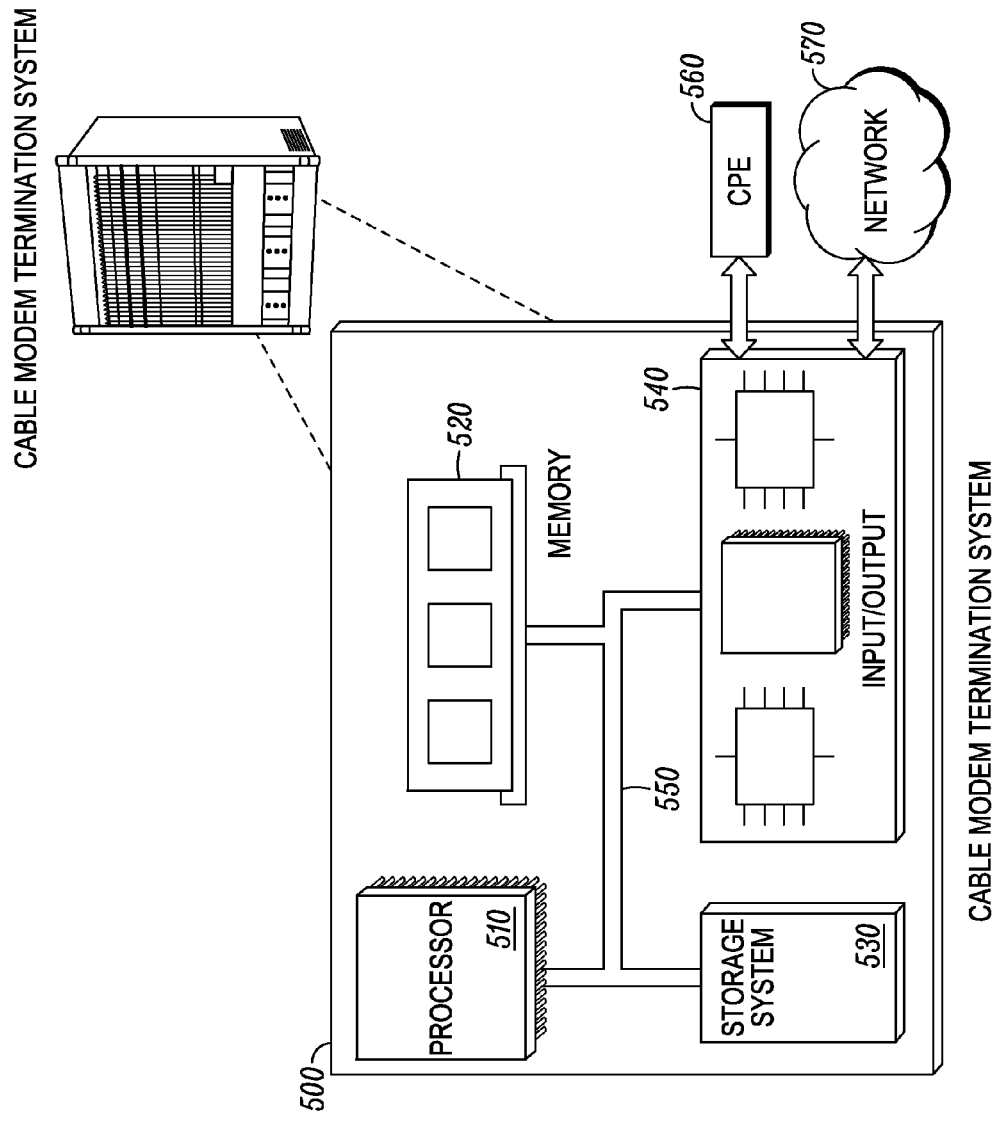
FIG. 5 is a block diagram of an example CMTS device that can employ the disclosed techniques.

FIG. 5 is a block diagram of an example CMTS device that can include cable modem congestion control. However, it should be understood that many different kinds of network devices (e.g., including network hubs, bridges, routers, edge termination devices, etc.) can implement the congestion control. The CMTS 500 can include a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the system 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the system 500. In one implementation, the input/output device 540 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more CPE devices 560 (e.g., set top box, cable modem, etc.), as well as sending communications to, and receiving communications from a network 570. Other implementations, however, can also be used, such as mobile computing devices, mobile communication devices, set-top box television client devices, etc.

Figure 6:
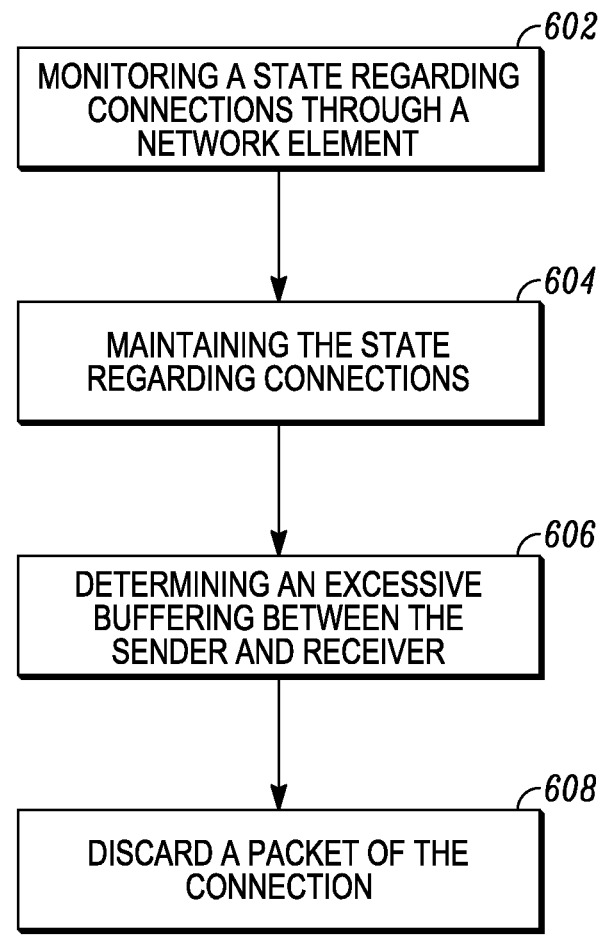
FIG. 6 depicts an example of a blind discard of packets by a cable modem termination system.

FIG. 6 depicts an example of a blind discard of packets in a cable system. As disclosed, embodiments for controlling latency via "blind" management of queue depth on interconnected TCP/IP transport devices is performed by a state-keeping protocol-aware device. Buffer bloat continues to cause latency problems for all kinds of IP traffic, especially non-TCP traffic used for real-time applications such as online gaming, Voice over IP, and Video over IP. A router, switch, or other smart-server (a state-aware transport device) either at the core of an internet or anywhere along the transport path, may keep state of the TCP/IP sessions, or keep state of sessionless connections such as UDP, and may conclude via an algorithm that the end-to-end, round-trip, or transitional latency is too high for a particular application.

At 602, the state-keeping protocol-aware device monitors a state regarding connections through a network element. At 604, the state-keeping protocol-aware device maintains the state regarding the connections through the network element and, at 606, determines that excessive buffering occurs along the path between a sender and a receiver. At 608, the state-keeping protocol-aware device discards a packet of the connection. In embodiments, the state-keeping protocol-aware device connections complies with the TCP protocol.

It is noted that excessive buffering may be determined by noting a difference between a last forward sequence number in a packet from the sender to the receiver on the TCP connection, and a last acknowledgement of that sequence number in a packet from receiver to sender.

The state-aware transport device may opt to target specific frames within a selected TCP session for Targeted Late Discard. Targeted means that the frame selected for discard is not random, it is selected via an algorithm, and late means that the frame has already arrived and stored, but is elected to be discarded in order to induce shrinking of the TCP sliding window, and therefore reduce the queue depth of the buffers of adjacent or nearby interconnected TCP/IP transport devices, with the overall net effect of reducing latency for other applications.

A state-aware transport device does not have any knowledge about the depth of queues along the session's path; it is therefore blind, and it must use its own internal algorithm to infer whether there has been an improvement in latency and to decide how many frames to discard from sessions in order to reduce latency, and to conclude whether the latency has been reduced. If no latency reduction is achieved, the device may discontinue using the Targeted Late Discard method. At no point will any device along the path be aware that the frame was intentionally discarded; it will appear to have been simply lost or dropped due to buffer overflow, and TCP will treat the session as such.

The algorithm for deciding which frames to keep and discard may vary, but disclosed are the following concepts to be incorporated to create a novel algorithm:

1) Being able to know if the latency for a particular stream or stateless session is improved (there has to be some internal metric by which the device can measure its effectiveness, such as state-keeping for sessions and sessionless protocols)
2) Not knowing (operating blind) how much the buffers have been affected on incoming devices, only that there is a measurable correlation between the discarded frames in TCP sessions and an improvement in latency for other applications 3) Targeting specific frames in specific TCP sessions in order to improve latency for other traffic.

In one or more examples, the functions described herein may be implemented in hardware, software, firmware, or any combination thereof. For example, the network device (e.g., CMTS, EQAM, network router, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

As described with respect to FIG. 4, a communication interface may connect the edge device 440 to the IP network 420 and HFC network 450. A bus is a communication medium that may connect a processor, e.g., CMTS processor, a data storage device, communication interface, DOCSIS external physical interface (DEPI), and memory (such as Random Access Memory (RAM), Dynamic RAM (DRAM), non-volatile computer memory, flash memory, or the like). In embodiments the communication interface utilizes downstream channels (e.g., channels 5-8) to communicate with the HFC network 450. The DEPI may connect the edge device 440 to the CMTS 425. In embodiments, on the edge device 440 is an application-specific integrated circuit (ASIC).

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection may be properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave, are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to communicate with a cable modem via a first channel or a first channel set; transmit, from a cable modem termination system (CMTS), a change request directing movement of a cable modem to a second channel or a second channel set, wherein the change request indicates an initialization technique for the cable modem to perform once synchronized to the second channel or the second channel set; determine whether the initialization technique was performed successfully by the cable modem; and transmit a retry request indicating an initialization technique if it is determined that the initialization technique in the change request was unsuccessfully performed by the cable modem, wherein the CMTS is configured to iteratively transmit subsequent retry requests based on a list of initialization techniques.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for managing transmission control protocol (TCP) forward buffering in a cable modem, the method comprising:
   scheduling time to receive a packet on an upstream channel from the cable modem;
   receiving, at a cable modem termination system, at least one upstream packet from the cable modem during the scheduled time and at least one scheduling request from the cable modem; and
   discarding based on information in the scheduling request, by the cable modem termination system, the at least one received upstream packet,
   wherein the cable modem termination system detects a backlog of data in a cable modem upstream flow queue, and
   wherein the cable modem termination system modifies or removes a Maximum Sustained Rate (MSR) Type-Length Value (TLV) parameter of a cable modem configuration file to enable the cable modem to make bandwidth requests in excess of a configured MSR TLV.

2. The method of claim 1, wherein the method for controlling a cable modem queue length is performed solely by the CMTS.

3. A method for managing transmission control protocol (TCP) forward buffering in a cable modem, the method comprising:
   scheduling time to receive a packet on an upstream channel from the cable modem;
   receiving, at a cable modem termination system, at least one upstream packet from the cable modem during the scheduled time and at least one scheduling request from the cable modem; and
   discarding based on information in the scheduling request, by the cable modem termination system, the at least one received upstream packet,
   wherein the at least one received upstream packet is a received upstream TCP packet, and the information in the at least one scheduling request from the cable modem that the cable modem termination system uses as the basis to discard the received upstream TCP packet is a size of a cable modem upstream service flow queue reported from the cable modem or is information used by the cable modem termination system to estimate the size of the cable modem upstream service flow queue.

4. The method of claim 3, wherein the cable modem termination system estimates the size of the upstream service flow queue by counting consecutive piggybacked bandwidth requests from the cable modem.

5. The method of claim 3, wherein the cable modem termination system detects a backlog of data in a cable modem upstream flow queue.

6. The method of claim 5, wherein the cable modem termination system detects the backlog of data in the cable modem upstream service flow from a backlog parameter of a DOCSIS Continuous Concatenation and Fragmentation bandwidth request received from the cable modem.

7. The method of claim 5, wherein the cable modem termination system detects the backlog of TCP payload packets on the cable modem upstream flow queue by snooping upstream and downstream packets to recognize TCP streams.

8. The method of claim 5, wherein detecting the backlog of data comprises identifying excessive buffering of transmission control protocol (TCP) payload packets in the cable modem upstream flow queue.

9. The method of claim 5, wherein the cable modem termination system modifies or removes a Maximum Sustained Rate (MSR) Type-Length Value (TLV) parameter of a cable modem configuration file to enable the cable modem to make bandwidth requests in excess of a configured MSR TLV.

10. The method of claim 3, wherein non-TCP traffic shares the same buffer as the TCP traffic.

11. A method for managing transmission control protocol (TCP) forward buffering in a cable modem, the method comprising:
   scheduling time to receive a packet on an upstream channel from the cable modem;
   receiving, at a cable modem termination system, at least one upstream TCP packet from the cable modem during the scheduled time and at least one scheduling request from the cable modem; and
   discarding based on information in the scheduling request, by the cable modem termination system, the at least one received upstream TCP packet,
   wherein after an initial discard of the at least one received upstream TCP packet, the cable modem termination system disables discarding for a cable modem upstream service flow for a time interval.

12. The method of claim 11, wherein the time interval is at least one of fixed, configured, or dynamically calculated via an algorithm.

13. A method for managing transmission control protocol (TCP) forward buffering in a cable modem, the method comprising:
   scheduling time to receive a packet on an upstream channel from the cable modem;
   receiving, at a cable modem termination system, at least one upstream TCP packet from the cable modem during the scheduled time and at least one scheduling request from the cable modem;
   selecting the at least one received upstream TCP packet for discarding, wherein an upstream TCP packet of only a particular format is selected for discarding; and
   discarding based on information in the scheduling request, by the cable modem termination system, the at least one received upstream TCP packet.

14. The method of claim 13, wherein the particular format for selecting the upstream packet for discarding is a particular format of a TCP payload packet.

15. A method for managing transmission control protocol (TCP) forward buffering in a cable modem, the method comprising:
   scheduling time to receive a packet on an upstream channel from the cable modem;
   receiving, at a cable modem termination system, at least one upstream packet from the cable modem during the scheduled time and at least one scheduling request from the cable modem; and
   discarding based on information in the scheduling request, by the cable modem termination system, the at least one received upstream packet,
   wherein each cable modem between TCP endpoints buffers at least a bandwidth delay product (BDP) of a desired TCP payload bandwidth multiplied by an uncongested round trip time (RTT).

16. A method of using a cable modem termination system as a cable modem proxy for managing transmission control protocol forward buffering in a cable modem, the method comprising:
- identifying, at the cable modem termination system, a maximum sustained rate (MSR) Type-Length-Value (TLV) parameter configured for the cable modem;
- removing or modifying the MSR TLV signaled to the cable modem in a cable modem configuration file read via TFTP to enable the cable modem to make bandwidth requests in excess of the configured Maximum Sustained Rate TLV; and
- discarding at least on received upstream packet.

17. The method of claim 16, further comprising recalculating a Message Integrity Code (MIC) before sending the MIC to the cable modem.

18. The method of claim 16, wherein the cable modem termination system is a TFTP proxy for the cable modem.

19. The method of claim 16, wherein removing the MSR TLV enables the cable modem to make unlimited MSR requests.

20. The method of claim 16, wherein the cable modem termination system identifies a backlog based on a removed or modified MSR TLV and a cable modem request to schedule delivery of an upstream packet.

21. The method of claim 16, wherein removing MSR TLVs signaled to the cable modem forces the cable modem to send a scheduling request to the cable modem termination system when it has an enqueued packet.

22. A method for discarding packets by a cable modem termination system, the method comprising:
- monitoring a state regarding connections through a network element;
- maintaining the state regarding the connections through the network element;
- determining that excessive buffering occurs along the path between a sender and a receiver, and
- discarding a packet of the connection,
- wherein excessive buffering is determined by noting a difference between a last forward sequence number in a packet from the sender to the receiver on a transmission control protocol (TCP) connection, and a last acknowledgement of that sequence number in a packet from receiver to sender.

23. The method of claim 22 wherein the connections comply with the TCP.

* * * * *